June 20, 1961
A. J. BENNETT
2,989,698
PHASE COMPARISON CIRCUITS
Filed Aug. 6, 1957
2 Sheets-Sheet 1
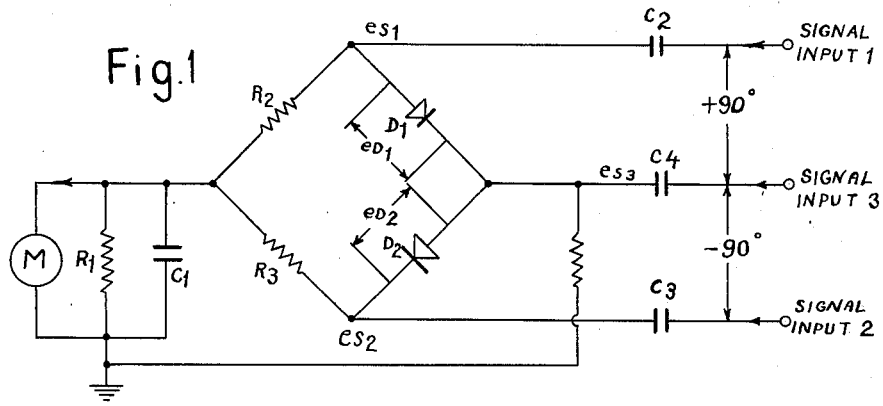
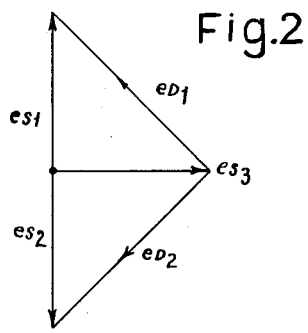
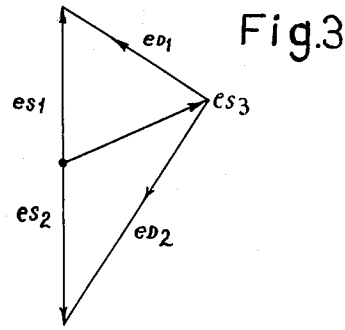
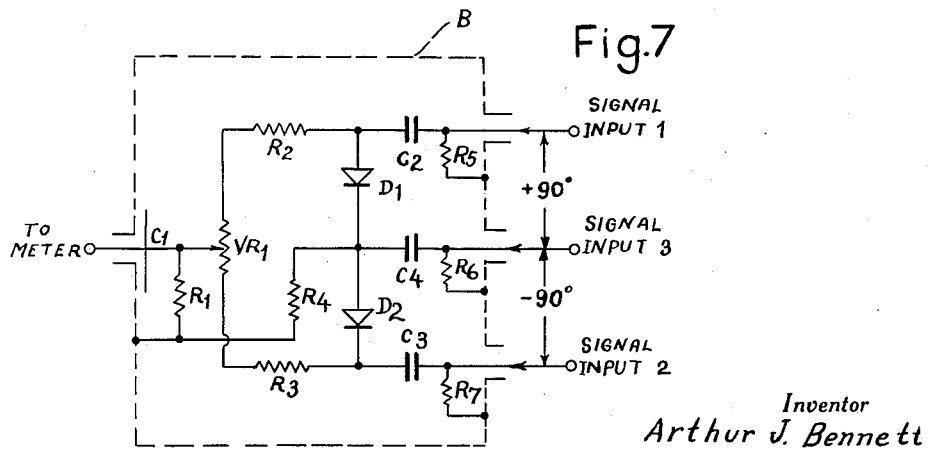
Inventor
*Arthur J. Bennett*
By
*Attorneys*

United States Patent Office 2,989,698
Patented June 20, 1961

2,989,698
PHASE COMPARISON CIRCUITS
Arthur J. Bennett, Cambridge, England, assignor to Pye Limited, Cambridge, England, a British company
Filed Aug. 6, 1957, Ser. No. 676,547
Claims priority, application Great Britain Aug. 13, 1956
7 Claims. (Cl. 324—83)

The present invention relates to phase comparison circuits, and more particularly to phase comparison circuits which can be employed for determining the phase relationship existing between two sources of radio frequency energy.

It is an object of the present invention to provide a phase comparison circuit which will operate satisfactorily despite a difference in amplitude between the two sources of signal whose phase is being compared.

It is a further object of the invention to provide a phase comparison circuit which requires no separate power supplies and which derives its power from the signal sources to which it is connected.

From one aspect the invention provides a phase comparison circuit, for comparing the phase relationship between two sources of alternating signal voltage, said circuit having three inputs, two of said inputs being fed with signals of opposite phase and substantially equal amplitude derived from one of said sources and the third of said inputs being fed with a signal derived from said other source, and the circuit producing a resultant output voltage depending in magnitude and direction upon the phase relationship between the two sources of signal, and the circuit being such that no resultant output voltage is produced when the signal from said second source is in phase quadrature with the two signals derived from said first source.

The invention also provides the method of determining the phase relationship between two sources of alternating signal voltage, which consists in comparing two signals of opposite phase and substantially equal amplitude derived from one of said sources with a signal derived from the other of said sources, so as to produce no resultant output voltage when the signal derived from the other source is in phase quadrature with both of the two signals derived from the one source, and an output voltage varying in magnitude and direction according to the amount and direction of the phase displacement between the signals from the two sources, when the signal derived from the other source is not in phase quadrature with the two signals derived from the one source.

The circuit may consist of a bridge arrangement, having two arms comprising rectifying devices with electrodes of opposite polarity connected together, and two arms comprising resistors. The two voltages of opposite phase from the first source are fed respectively one to each of the two junctions between a resistor and a rectifier, and the voltage from the second source is fed to the junction between the two rectifiers. Any resultant rectified output voltage from the circuit is produced across a load connected to the junction between the two resistors.

The output from the phase comparison circuit may be fed to an indicating device such as a voltmeter, which is preferably a centre-zero instrument, and which may be calibrated directly in actual phase angle when the amplitudes of the two signal sources are predetermined and fixed. Alternatively, the output voltage from the circuit may be fed directly or through an amplifying device to a control device, such as a relay, or a variable length transmission line which operates to restore a pre-determined phase condition between the two signal sources.

Such an arrangement may be particularly employed for adjusting the phase between two radio frequency signal transmitters operating in parallel or simultaneously on the same frequency.

From another aspect therefore the invention provides an arrangement for adjusting the phase between two radio frequency transmitters, which consists in a variable length transmission line connected between the driving source and one of the transmitters, a phase comparison circuit constructed according to this invention, for comparing the phase of the two outputs of said two transmitters and for providing an output voltage depending in magnitude and direction upon the phase relationship of said two outputs, said output voltage being fed to an indicating device and/or to control the adjustment of the variable length transmission line. The two transmitters may be fed from a common driving source.

A scale may be associated with the variable length transmission line, bearing calibrations enabling the degrees of phase shift introduced by said variable length transmission line to be determined.

In order that the invention may be more fully understood, reference will now be made to the accompanying drawings, in which:

FIG. 1 is a diagram of a basic phase comparison circuit according to the invention.

FIGS. 2 and 3 are explanatory vector diagrams.

FIG. 7 shows a practical form of phase comparison circuit.

Referring to FIG. 1, there is shown a bridge circuit comprising two rectifying devices D1 and D2 having electrodes of opposite polarity connected together, and two resistors R2 and R3. Two anti-phase signal voltages from one signal source are fed to inputs 1 and 2 respectively through condensers C2 and C3. A signal voltage from a second signal source is fed to the junction of the two rectifiers from the input 3 through condenser C4, the voltage being developed across resistor R4. Any rectified output voltage from the bridge circuit is developed across resistor R1 and condenser C1 connected to the junction of the two resistors R2 and R3, and may be applied to a meter M which is off the centre-zero type, and may be calibrated directly in phase angle when the amplitude of the two signal sources are predetermined and fixed.

If it is arranged that the amplitude of the signals fed to inputs 1 and 2 are equal, then with the circuit described, no output voltage will be developed across resistor R1 when the signal at input 3 is in phase-quadrature with the signals at inputs 1 and 2. The amplitude of the signal at input 3 does not have to be equal to that at inputs 1 and 2 for the circuit to function properly but the sensitivity of the device as a whole is affected by the amplitude of the signal at input 3. The meter M connected across resistor R1 will deflect one way or the other according to the phase relationship existing between the two input signal sources.

The operation of the device will now be described with reference to the vector diagrams of FIGS. 2 and 3.

Let the voltages at the inputs 1, 2 and 3 be represented by $e_{s1}$, $e_{s2}$, and $e_{s3}$, respectively and the voltages across the two rectifying devices D1 and D2 be represented by $e_{D1}$, and $e_{D2}$, respectively, then FIG. 2 shows a vector diagram when $e_{s3}$ is 90° out of phase with $e_{s1}$ and $e_{s2}$ making $e_{D1}=e_{D2}$, whereby no rectified output voltage will be produced across resistor R1.

FIG. 3 illustrates what happens when this phase relationship is upset, the voltages $e_{D1}$ and $e_{D2}$ become unequal, and a D.C. current will then flow through R1 due to the rectifying action of the diodes D1 and D2. The polarity of this current will depend upon whether the vector $e_{s3}$ rotates clockwise or anti-clockwise. This current will cause a corresponding deflection of the meter M.

A phase comparison circuit according to the invention may be advantageously employed to determine or monitor the phase relationship between two radio frequency signal transmitters operating in parallel or simultaneously on the same frequency, for example feeding aerial arrays associated with the same aerial structure, since it enables a continuous check to be kept on their phase relationship.

Figure 4:
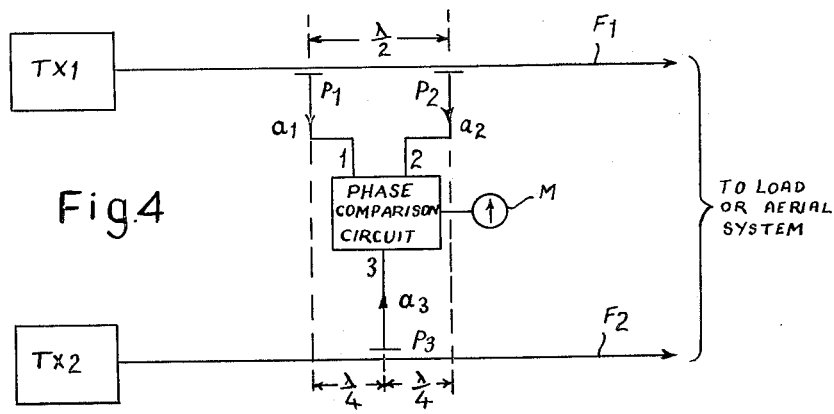
FIGS. 4, 5 and 6 are circuit arrangements illustrating the use of a phase comparison circuit according to the invention.

FIG. 4 shows a circuit arrangement employing a phase comparator according to the invention for the above purpose, although a similar arrangement may be employed for determining the phase relationship between any two R.F. signals. The outputs from two transmitters TX1 and TX2 operating on the same frequency are fed respectively to a load or aerial system over feeders F1 and F2. Two probes P1 and P2 are associated with feeder F1 and arranged a half wavelength apart to derive two signal outputs in anti-phase which are fed respectively to inputs 1 and 2, of a phase comparison circuit, as described with reference to FIG. 1. The probe P3 associated with the feeder F2 from transmitter TX2, is arranged to derive a voltage which is in phase quadrature to the voltages derived from the probes P1 and P2 and which is fed to the input 3 of the phase comparison circuit. The length of the lines a1, a2 and a3, are arranged to preserve the correct phase relationships at inputs 1, 2 and 3. The phase relationship between the outputs from the two transmitters is indicated on the centre-zero meter M, and it will be appreciated that by reason of the location of the probes, producing a signal from probe 3, in phase-quadrature to the anti-phase signals from probes P1 and P2, no output voltage will be produced when the signals from transmitters TX1 and TX2 are in phase.

Figure 5:
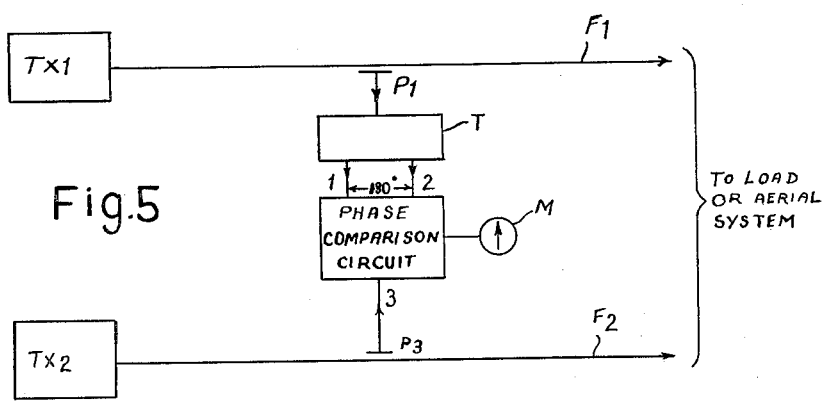

FIG. 5 shows a modification of the circuit arrangement just described, in which the two anti-phase signals fed to inputs 1 and 2 are produced by means of a balance-to-unbalance transformer T connected to feeder F1 by a single probe P1; these signals again being in phase-quadrature with the input derived from probe P3.

Figure 6:
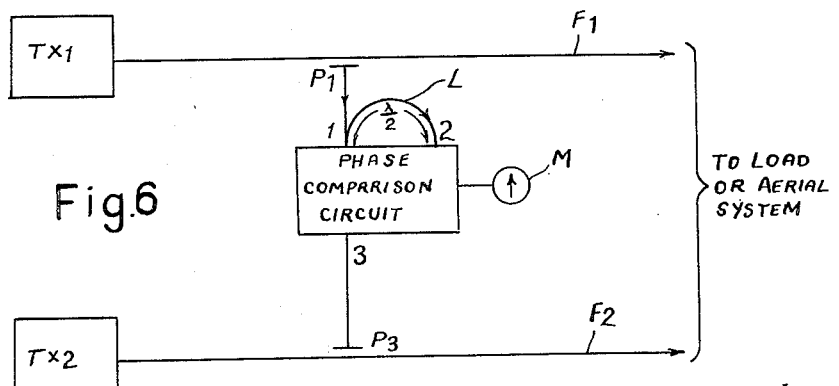

FIG. 6 shows a further modification of the circuit of FIGURE 4, in which the 180° phase difference of the signal between inputs 1 and 2 is obtained by means of a half-wave section line L between inputs 1 and 2.

FIG. 7 shows a practical arrangement of the bridge circuit of FIG. 1, in which the various parts of the phase comparison circuit are enclosed within a screened box B. The diodes D1 and D2 comprise crystal diodes and the three inputs are lead through suitable apertures in the box as is also the output of the indicating meter or phase-connecting device. The three inputs are connected to the screened box B through resistors R5, R6 and R7 respectively. The potentiometer VR1 is included in the circuit to enable differences in diode characteristics and signal level differences at the balanced inputs 1 and 2 to be equalised at the output.

The phase-comparison circuits according to the invention possess the important advantage that they operate satisfactorily to give a measurement of phase relationship despite differences in amplitude between the two signal sources, provided that the amplitudes are predetermined and substantially fixed. Thus the circuits may be employed for comparing the phase between two frequency modulated transmitters bearing fixed and predetermined amplitude relationships. Also the circuits are independent of amplitude variations between the two signal sources once the two sources are in phase and hence are particularly adapted for indicating "in phase" conditions between two amplitude modulated radio frequency transmitters, such as television transmitters operating in parallel. Furthermore if crystal or similar diodes are employed, no separate power supplies are required since all operative power is derived from the signal sources whose phase is being compared. The circuits may therefore be made very compact. The circuits also have inherently wide band characteristics, because they do not include any tuned elements. Therefore, the operation at high frequencies will only be limited by the physical size of the layout, and the components used.

In one arrangement employing a phase comparison circuit according to the invention for phasing two amplitude modulated radio frequency transmitters, such as television transmitters, operating in parallel, a phasing device is inserted between one of the transmitters and the driving source which is common to both transmitters and serves to alter the phase of the transmitter concerned. The phasing device consists of a concentric transmission line having two telescopic parts formed in the nature of a trombone. Attached to the device is a mechanical connection to a rotating indicator device so that as the trombone portion is moved the indicator revolves and by a suitable choice of dimensions the indicator can be calibrated in electrical degrees of phase shift produced by the movement of the trombone.

Associated with the phasing device is a centre-zero meter connected to the output from a phase comparison circuit according to the present invention. When the centre-zero meter indicates an out of phase condition between the two transmitters, the phasing device can be operated manually, or automatically by means of an electric motor controlled by circuits deriving their controlling signals from the phase comparison circuit. The indicator on the phasing device is useful because it enables the device to be operated either to insert a given amount of phase displacement or to show what phase displacement has taken place between the two transmitters by the amount of movement of the indicator occurring as the phasing device is altered to bring the two transmitters into phase.

Whilst particular embodiments have been described, it will be understood that various modifications may be made without departing from the scope of the invention. Thus, although the invention has been described for comparing and adjusting the phase between two alternating signal sources it can obviously be employed with more than two sources, in which case the sources are taken together successively in pairs in order to carry out the desired comparison or adjustment.

I claim:

1. A circuit arrangement for determining the phase between two radio frequency transmitters operating simultaneously on the same frequency, comprising a transmission line connected to the output from each transmitter, a phase comparison circuit comprising two rectifiers each having an anode and a cathode, means connecting the anode of one rectifier to the cathode of the other rectifier, a pair of series-connected resistors connected between the cathode of said one rectifier and the anode of said other rectifier, a pair of condensers respectively connected to the junctions of said resistors and said rectifiers, means for feeding two signals of opposite phase and substantially equal amplitude derived from one of said transmitters to said two condensers, a further condenser connected to the junction point between said two rectifiers, means for feeding a signal derived from said other transmitter to said further condenser in phase quadrature to said first-mentioned two signals, whereby said phase comparison circuit compares the output frequencies of the two transmitters and produces an output voltage varying in magnitude and direction according to the amount and direction of the phase differences between the two transmitter frequencies, a voltmeter connected between the junction point between said two resistors and a point of fixed potential for indicating the magnitude and direction of the output voltage from said phase comparison circuit and means for producing a predetermined phase condition between the output frequencies from the two transmitters.

2. A circuit arrangement as claimed in claim 1, comprising a probe coupled to the transmission line from one transmitter, means connecting said probe to two inputs of said phase comparison circuit so as to produce said two signals in antiphase at said two condensers in said phase comparison circuit and a probe coupled to the transmission line from the other transmitter in the position to produce the signal fed to a further condenser in said phase comparison circuit which is in phase quadrature to said two antiphase signals derived from said first transmitter.

3. A circuit arrangement as claimed in claim 7, in which said means connecting said probe to two inputs of said phase comparison circuit comprises a balance-to-unbalance transformer.

4. A circuit arrangement as claimed in claim 7, in which said means connecting said probe to two inputs of said phase comparison circuit comprises a half-wave section of transmission line.

5. A phase comparison circuit for comparing the phase relationship between two sources of alternating signal voltage, comprising two rectifiers each having an anode and a cathode, means connecting the anode of one rectifier to the cathode of the other rectifier, a pair of series-connected resistors connected between the cathode of said one rectifier and the anode of said other rectifier, a pair of condensers respectively connected to the junctions of said resistors and said rectifiers, means for feeding two signals of opposite phase and substantially equal amplitude derived from one of said sources to said two condensers, a further condenser connected to the junction point between said two rectifiers means for feeding a signal derived from said other source in phase quadrature to said first-mentioned two signals to said further condenser, and a voltmeter connected between the junction point between said two resistors and a point of fixed potential.

6. A phase comparison circuit as claimed in claim 5, including a potentiometer device connected between the two series-connected resistors, and a centre-zero voltmeter connected between the adjustable tapping of said potentiometer device and a point of fixed potential.

7. A circuit arrangement as claimed in claim 1, comprising two probes coupled to the transmission line from one transmitter arranged a half wavelength apart and connected to inputs of said phase comparison circuit to produce said two signals in antiphase at said two condensers in said phase comparison circuit and a probe coupled to the transmission line from the other transmitter in a position to produce the signal fed to the further condenser in said phase comparison circuit which is in phase quadrature to said signals derived from said first transmitter.

References Cited in the file of this patent

UNITED STATES PATENTS

| | | |
|---|---|---|
| 1,802,742 | Von Arco | Apr. 28, 1931 |
| 1,929,216 | Pfannenmuller | Oct. 3, 1933 |
| 2,084,836 | Buschbeck | June 22, 1937 |
| 2,229,774 | Schulze-Herringen | Jan. 28, 1941 |
| 2,283,676 | Kandoian | May 19, 1942 |
| 2,425,009 | Shepherd | Aug. 5, 1947 |
| 2,556,119 | Stribling | June 5, 1951 |
| 2,751,429 | Schlesinger | June 19, 1956 |
| 2,838,733 | Longfellow | June 10, 1958 |
| 2,890,331 | Norton | June 9, 1959 |
| 2,903,581 | Kippenhan | Sept. 8, 1959 |
| 2,919,404 | Rock | Dec. 29, 1959 |

OTHER REFERENCES

"Phase Selective Detectors," article in Electronics, February 1954; pages 182–192.